United States Patent
Hede et al.

(10) Patent No.: US 8,648,482 B2
(45) Date of Patent: Feb. 11, 2014

(54) WIND TURBINE, DRIVE TRAIN ASSEMBLY, WIND TURBINE NACELLE SYSTEM, METHODS FOR CONVERTING ROTATIONAL ENERGY AND METHODS FOR BUILDING A NACELLE AND FOR RE-EQUIPPING A WIND TURBINE

(75) Inventors: Ivan Arthur Hede, Brande (DK); Andreas Christian Hohle, Alsdorf (DE); Christian Hohmann, Mülheim an der Ruhr (DE); Claudia Kummer, Aachen (DE); Helmut Kölpin, Baesweiler (DE); Ying Li, Aachen (DE); Brice Tchemtchoua, Montzen (BE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 13/174,828

(22) Filed: Jul. 1, 2011

(65) Prior Publication Data

US 2012/0019001 A1    Jan. 26, 2012

(30) Foreign Application Priority Data

Jul. 9, 2010 (EP) .................................... 10169066

(51) Int. Cl.
*F03D 9/00* (2006.01)
*H02P 9/04* (2006.01)

(52) U.S. Cl.
USPC ............................................................ 290/44

(58) Field of Classification Search
USPC .................................... 290/43, 44, 55, 54
See application file for complete search history.

(56) References Cited

U.S. PATENT DOCUMENTS

| 2008/0054641 | A1 | 3/2008 | Voss | |
|---|---|---|---|---|
| 2011/0171028 | A1* | 7/2011 | Hohle et al. | ..................... 416/95 |
| 2012/0243998 | A1* | 9/2012 | Becker et al. | ............. 416/169 R |

FOREIGN PATENT DOCUMENTS

| EP | 0045264 A2 | 2/1982 |
|---|---|---|
| EP | 1363019 A2 | 11/2003 |

OTHER PUBLICATIONS

Machine translation of EP 0045264 A2. no date.*

* cited by examiner

*Primary Examiner* — Javaid Nasri

(57) ABSTRACT

A wind turbine with a drive train connecting a drive unit with a generator assembly is provided. The generator assembly includes a first generator with a first stator and a first rotor, the first rotor being directly connected to the drive train, and at least a second generator indirectly coupled to the drive train via a gear box. Further, a drive train assembly, a wind turbine nacelle system, a method for converting rotational energy into electrical energy, a method of building a nacelle and methods of re-equipping a wind turbine are provided.

10 Claims, 4 Drawing Sheets

FIG 2  STATE OF THE ART

WIND TURBINE, DRIVE TRAIN ASSEMBLY, WIND TURBINE NACELLE SYSTEM, METHODS FOR CONVERTING ROTATIONAL ENERGY AND METHODS FOR BUILDING A NACELLE AND FOR RE-EQUIPPING A WIND TURBINE

CROSS REFERENCE TO RELATED APPLICATIONS

This application claims priority of European Patent Office Application No. 10169066.1 EP filed Jul. 9, 2010, which is incorporated by reference herein in its entirety.

FIELD OF INVENTION

The present invention concerns a wind turbine with a drive train connecting a drive unit (also called rotor unit) with a generator assembly. It also concerns a drive train assembly, a wind turbine nacelle system, a method for converting rotational energy into electrical energy, a method of building a nacelle and methods of re-equipping a wind turbine.

BACKGROUND OF INVENTION

Large wind turbine systems for offshore or onshore use convert rotational energy of a rotor driven by the wind into electrical energy. The conversion is either done directly or indirectly. In the first case the relatively slow rotation of a drive train connected to the hub of the wind turbine is directly converted into electrical energy. This is realized by directly attaching a rotor of a generator to the drive train, while a stator of this generator is assembled around the drive train in the region of the generator's rotor. Together, the stator and the rotor attached to the drive train form the main parts of the generator. It may be noted in this context, that in any of the following embodiments, the rotor (and this may imply the drive train) can also be assembled around a stator just as well. In contrast, indirect conversion means that the relatively slow rotation of the drive train is converted in a gear box into a faster rotation speed of a second drive train (named "output drive train" in the following passages) which then feeds a generator.

Direct driven generators are generally much bigger, heavier and thus costlier to produce and assemble. However, while gear box driven generators are lighter, smaller and thus cheaper they have the disadvantage of necessitating an additional part, i.e. the gear box. Such gear box requires additional assembly and maintenance efforts and is yet again an expensive component. In addition, the noise emission of such gear box in comparison with a direct drive generator is also an important factor which needs to be considered.

Gear box-based generators can be realized as a so-called multibrid and/or multi-generator assemblies. A multibrid system means that the gear box and the generator are included in one single housing. Additionally, such systems may also comprise an azimuth drive (for orientating the wind turbine into the wind). Optionally the shaft bearing of the wind turbine's main shaft may also be integrated in the housing.

A multiple generator assembly means that several generators are assembled behind a gear box which converts the rotational energy of the drive train into rotations of several second output drive trains which then lead into one generator each. The system has the advantage of allowing the use of even smaller generators instead of one larger generator and of a high efficiency factor.

Still, even with multibrid or multiple-generator assemblies there remains the problem of relatively high assembly and maintenance efforts for indirectly-driven generator systems.

SUMMARY OF INVENTION

It is an object of the invention to supply a possibility of how to construct and/or re-equip a wind turbine such that the above-mentioned drawbacks of direct drive and indirect drive systems are reduced.

This object is achieved by a wind turbine, a drive train assembly and a wind turbine nacelle system according to the independent claims.

Thus, a wind turbine of the aforementioned kind is realized such that the generator assembly comprises a first generator with a first stator and a first rotor, the first rotor being directly connected to the drive train, and at least a second generator indirectly coupled to the drive train via a gear box.

In other words, a direct driven generator is put in series with a gear box driven generator. This allows to use each of those two generators under optimum conditions at partial load. At the same time, the costs for both the gear box and the two generators can be substantially reduced in comparison with assemblies that use either direct drive or indirect drive systems. This is due to the fact that smaller devices can generally be used than necessary if used alone to cover the full load. As the mass of a direct drive generator is proportional to its square output, a reduction of the output for example by half would mean a reduction of mass to a quarter. Similar calculations also apply for the mass of gear boxes. Therefore, by combining direct drive and indirect drive systems in one wind turbine, a reduction of overall mass can be realized in comparison with at least a direct drive system. Furthermore, this also implies a major reduction in size of the direct drive generator. While direct driven generators according to the state of the art can reach diameters of up to 6 m, the diameter of a smaller direct driven a generator as can be used in the context of the invention will be substantially reduced. This means that the size of the wind turbine, in particular the nacelle, can also be reduced enormously and also that the transport of the components of such wind turbine to a place where the turbine is assembled gets by far easier.

In order to realize such wind turbine, a drive train assembly according to the invention can be used. This drive train assembly connects a drive unit with a generator assembly, which generator assembly comprises a first generator with a first stator and a first rotor, the first rotor being directly connected to a drive train of the drive train assembly, and at least a second generator indirectly coupled to the drive train via a gear box. Those parts of the drive train assembly comprise interfaces which are chosen such that the parts fit together amongst each other and with the drive unit.

Such drive train assembly according to the invention can be supplied alone or in combination with some or all other necessary components for the construction of a wind turbine. It can thus also be used as a replacement set for an existing drive train assembly of another kind.

Accordingly, the method for converting rotational energy into electrical energy according to the invention is carried out by means of a wind turbine with a drive train connecting a drive unit with a generator assembly, whereby a first part of the rotational energy is converted by a first generator with a first stator and a first rotor, the first rotor being directly connected to the drive train, and a second part of the rotational energy is converted by at least a second generator indirectly coupled to the drive train via a gear box.

Such method implies that rotational energy is essentially divided into two parts, one of which is used by the direct driven generator, the other of which is the gear box driven generator.

In order to allow the combination of such two generators for re-equipment in existing wind turbines, but also to permit the construction of different types of new wind turbines according to the invention, use can be made of a wind turbine nacelle system for building a nacelle which houses components of a wind turbine, amongst which components there are a drive train connecting a drive unit with a generator assembly and the generator assembly itself. Such nacelle system according to the invention comprises a first nacelle part and a series of second nacelle parts, the first nacelle part and any one of the series of second nacelle parts forming the nacelle. Thereby, the series of second nacelle parts comprises second nacelle parts different in size.

Such wind turbine nacelle system is thus a kind of modular system in which one first nacelle part is combined with one out of a choice of several different second nacelle parts. In this context it may be noted, that the first nacelle part and/or the second nacelle parts may be comprised of several sub-parts or be realized as one single part. It may further be noted, that also the first nacelle part may be one first nacelle part out of a series of first nacelle parts. However, it need not necessarily be so, which means that the first nacelle part may be a nacelle part of one specific size with no alternative sizes available. The first and second nacelle parts may also be considered to be shell parts of the outer shell of a nacelle to be assembled.

As a result, the invention also concerns a nacelle for housing components of a wind turbine according to the invention, in particular a drive train assembly according to the invention, made up by a wind turbine nacelle system according to the invention.

The invention further concerns a method of building a nacelle of a wind turbine which nacelle houses components of the wind turbine, amongst which components there are a drive train connecting a drive unit with a generator assembly and the generator assembly itself. Such method comprises according to the invention the steps of supplying a first nacelle part of a wind turbine nacelle system, choosing one second nacelle part out of a series of second nacelle parts comprising second nacelle parts different in size, the choice being based on the size and/or weight of the generator assembly, forming the nacelle out of the first nacelle part and the chosen second nacelle part by combining them.

In essence, this method makes use of the wind turbine nacelle system according to the invention as described above. One particular second nacelle part out of the series of second nacelle parts is chosen and combined with the first nacelle part so that a nacelle of a wind turbine is constructed.

Such method of building a nacelle can also be used in the context of the re-equipment of a wind turbine with a new generator assembly different from an old generator assembly previously used in it. Thereby, the wind turbine comprises a nacelle according to the invention and the second nacelle part is exchanged with a different second nacelle part chosen out of the series of second nacelle parts. For instance, a wind turbine nacelle housing only a direct drive generator can be re-equipped with a generator assembly including both a direct drive and a gear box driven generator. This means, that the nacelle need not be as big in diameter as previously, whereas instead it will be longer than before. Therefore, the first nacelle part has a size which may remain as it was before. The new second nacelle part will be a nacelle part with smaller diameter and greater length than the previously used second nacelle part.

Lastly, the invention also concerns a method of re-equipping a wind turbine with a new generator assembly different from an old generator assembly previously used in it. Thereby, the new generator assembly comprises at least one additional generator in comparison with the old generator assembly. This method is preferably realized in combination with the method of re-equipping a wind turbine as described above.

Particularly advantageous embodiments and features of the invention are given by the dependent claims, as revealed in the following description. Thereby, features revealed in the context of one category of the invention may also be realized in the context of any of the other categories of the invention.

In a preferred embodiment, the second generator and the gear box are comprised in a common operation unit. This can optionally be enhanced by the operation unit further comprising an azimuth drive. In other words, it is preferred that use is made of a multibrid generator as described above as a second generator. This is of particular use in the context of the invention, because the combination of two generators along the drive train implies that the overall length of the wind turbine from the rotor to the end of the indirect drive generator (facing away from the first, direct drive generator) is increased in comparison with a wind turbine according to the state of the art taken that both generator assemblies have the same nominal power output. Therefore, any reduction of length, as can be realized by a multibrid generator, is more than welcome and thus highly advantageous.

It is also preferred that the gear box comprises several output drive trains driving in operation the second generator and at least a third generator. The second generator and the third generator, possibly combined with one or several more generators, are then part of a multi-generator assembly as described above and may be housed in a common housing together. The application of such multi-generator assembly in the context of the invention provides for a lighter weight generator assembly and also implies that the overall load is divided into more than just two parts, namely into one large part covered by the direct drive generator and into several even smaller parts covered by the multitude of indirect drive generators. This can lead to an even better output of electrical energy, i.e. it means an optimum conversion of rotational energy into electrical energy.

As a further enhancement, the wind turbine according to the invention may comprise a control unit that in operation derives control commands from variable input data. These control commands serve to adjust the percentage of rotational energy of the drive train converted by the first generator and/or by the second generator and/or by the third generator. Such variable input data may be in particular input data referring to the overall load distributed by the drive train. It may thus comprise data concerning the rotation speed of the drive train and/or data relating to current wind conditions. Such data are converted into control commands to adjust the energy intake of at least one of the generators. In effect, the other generator(s) will then receive the other part of rotational energy for conversion. In order to realize such adjustment of energy intake, the wind turbine preferably comprises at least one adjustment unit connected to the first generator and/or to the second generator and/or to the third generator which adjusts the percentage of rotational energy in dependence of the control commands. Such adjustment unit may for example be positioned within at least one of the generators. For instance, it may adjust the distance in between the rotor and the stator of a generator which implies that the rotational energy converted by this very generator into electrical energy is varied.

Concerning the nacelle according to the invention, a first alternative is that the first nacelle part is such that in an assembled state of the nacelle it is further away from the drive unit than any of the series of second nacelle parts. According to a second alternative, the first nacelle part is such that in an assembled state of the nacelle it is closer to the drive unit than any of the series of second nacelle parts. The choice between these alternatives is preferably based on the following assumptions, i.e. the circumstances due to which the second nacelle part is exchanged: When adding a direct drive generator to an already existing indirect drive generator within a nacelle, it is preferred to exchange a nacelle part closer to the drive unit (i.e. assembled in the sense of the second alternative) because a direct drive generator still has a larger diameter than an indirect drive generator. In contrast, when adding a new indirect drive generator to an existing direct drive generator, the first alternative is preferred instead. This is due to the fact that the diameter of the nacelle has already been set by the direct drive generator whilst the indirect drive generator mainly adds an extra length to the wind turbine. That means that the second nacelle part must be chosen such that it is firstly long enough and secondly that it builds up in combination with the first nacelle part a structurally stable system which is in balance in assembly on a wind turbine tower.

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the drawings, like reference numbers refer to like objects throughout. Objects in the diagrams are not necessarily drawn to scale.

DETAILED DESCRIPTION OF INVENTION

Figure 1:
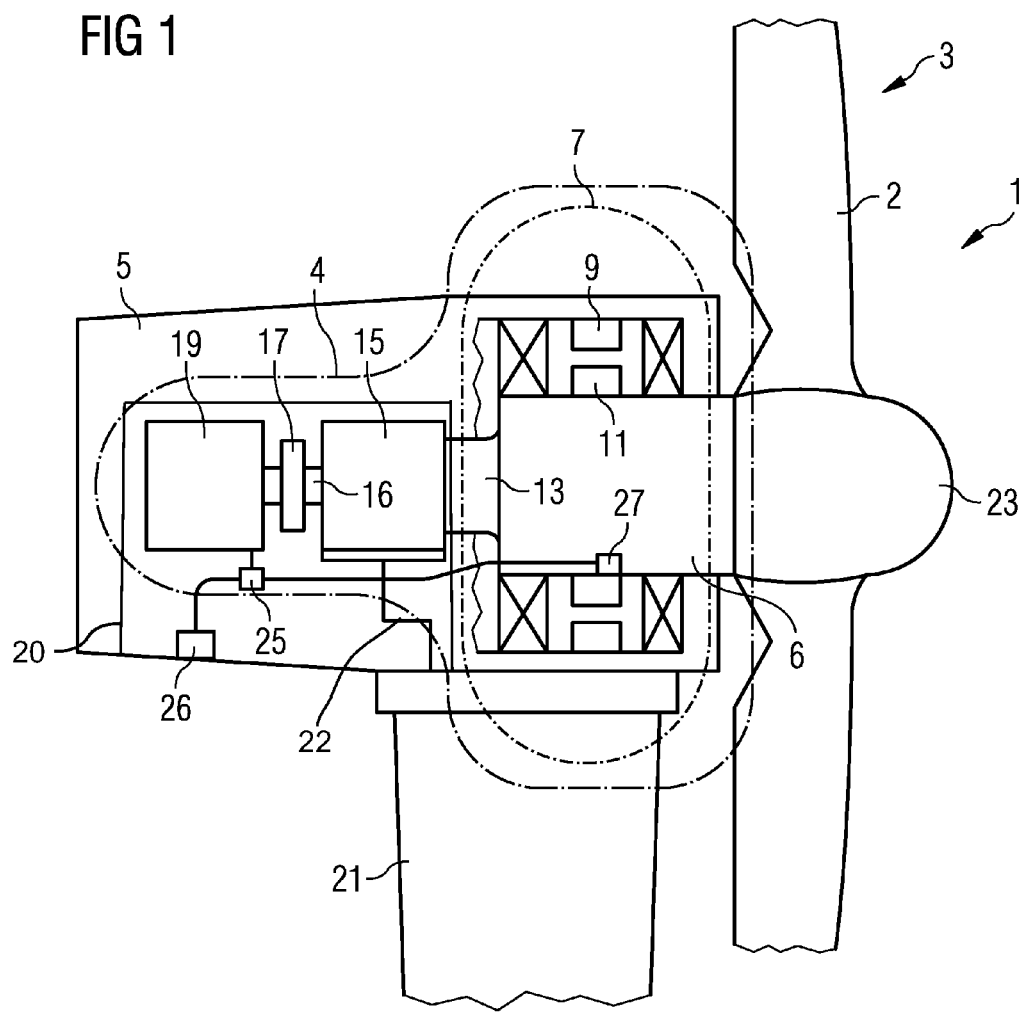
FIG. 1 shows a sectional view of a wind turbine according to an embodiment of the invention.

FIG. 1 shows a sectional view of a wind turbine 1, which is principally made up of tower 21, a nacelle 5 and a drive unit 3, comprising rotor blades 2 connected to a hub 23. The rotational energy of the drive unit 3 is transferred into the inside of the nacelle 5 by means of a drive train 13 with a main shaft 6 coupled to the hub 23. The drive train 13 is part of a drive train assembly 4 further comprising a first generator 7, a gear box 15, an output drive train 16, a break 17 and a second generator 19.

Furthermore the wind turbine 1 comprises a measurement and adjustment system made up of a measurement unit 26, a control unit 25 and an adjustment unit 27.

Figure 5:
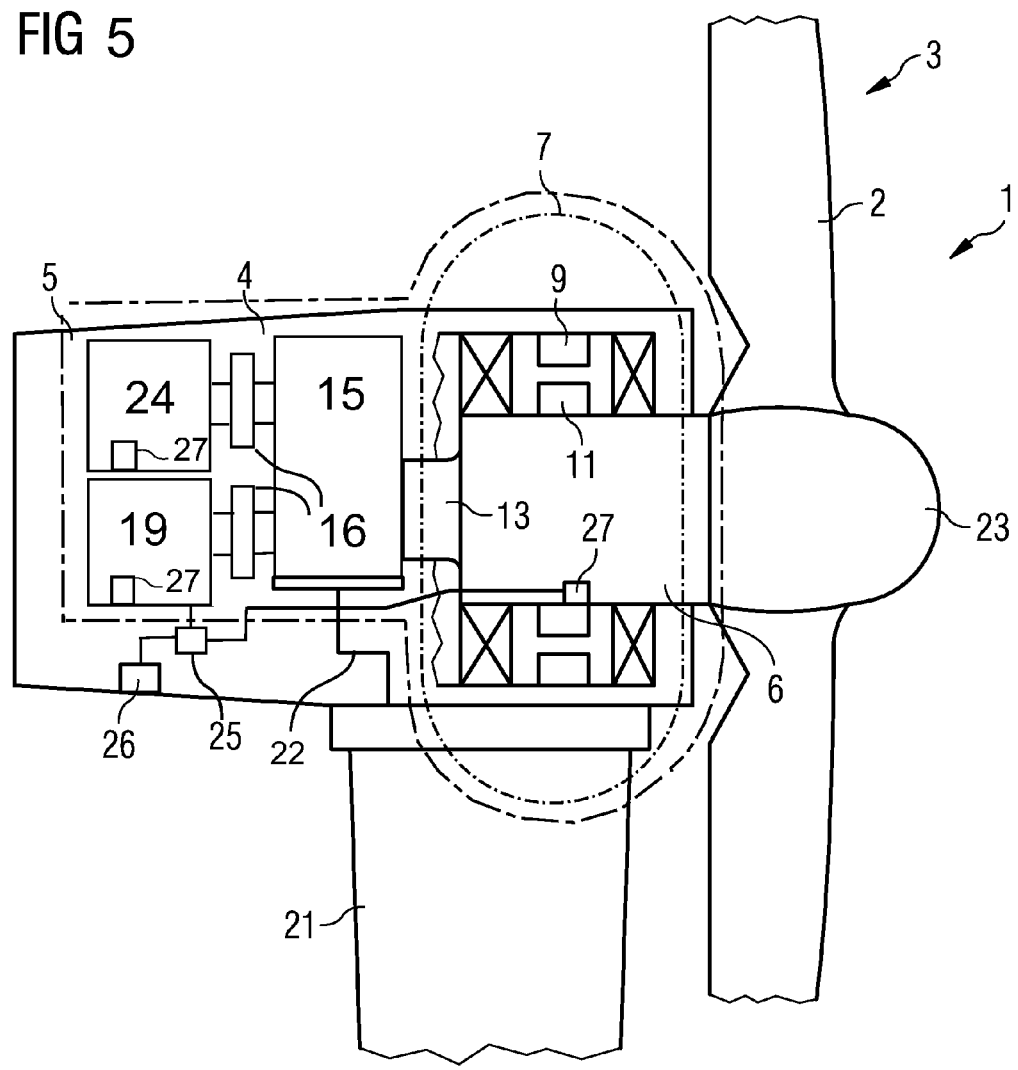
FIG. 5 shows a sectional view of a wind turbine according to an alternate embodiment of the invention.

The first generator 7 is realized in the form of a direct drive generator. This means that the first generator 7 comprises a first stator 9 fixedly positioned within a generator housing (not shown) and a first rotor 11 which is directly connected to the drive train 13. Such direct connection means that whenever the drive train 13 rotates, the first rotor 11 is automatically moved with the drive train 13 at the same rotation speed. Thus, no conversion of rotation is made for the operation of the first generator 7, in particular of the first rotor 11. In contrast, the second generator 19 is connected to the drive train 13 via a gear box 15. This means that the rotation of the drive train 13 is converted into a different rotation, in particular with a higher rotation speed, of an output drive train 16 positioned in between the gear box 15 and the second generator 19. The second generator 19, which is only depicted schematically as a box, comprises a second stator and a second rotor (both not shown) by means of which the rotational energy of the output drive train 13 is converted into electrical energy. In an exemplary embodiment the second generator 19 and the gear box 15 may be located in a common operation unit 20. The common operation unit 20 may optionally include an azimuth drive 22. An alternate exemplary embodiment shown in FIG. 5 may include several output drive trains 16 driving in operation the second generator 19 and at least a third generator 24, each generator having its own adjustment unit.

The rotational energy of the drive train 13 is therefore used to generate electrical energy both in the first generator 7 and indirectly in the second generator 19, so that an added overall energy output is achieved. Because the maximum load on any one of the first generator 7 and the second generator 19 is substantially reduced in comparison with a wind turbine with only one generator or with generators of only one kind (direct drive or indirect drive), the sizes of both the first generator 7 and of the gear box 15 can be considerably reduced in comparison with gear boxes and direct drive generator in wind turbines according to the state of the art.

The measurement and adjustment system serves to adjust the amount of rotational energy converted by one particular of the generators 7, 19 in dependence of variable input data. These variable input data are measured by the measurement unit 26: in this particular case, it measures the wind speed outside the nacelle 5 from which there can be derived information about the expected rotation speed of the drive train 13. From these variable input data the control unit 25 derives control commands in order to adjust the amount of energy converted by the first generator 7. For that purpose, the adjustment unit 27 is located in the first generator 7. For instance, it can adjust the distance between the first rotor 11 and the first stator 9. With such measures the energy input of the rotational energy of the drive train 13 for the first generator 7 is adjusted. This also implies that the second generator 19, which receives the other part of the rotational energy, will receive a variable amount of rotational energy to convert into electrical energy independence of the adjustment by the adjustment unit 27.

Figure 2:
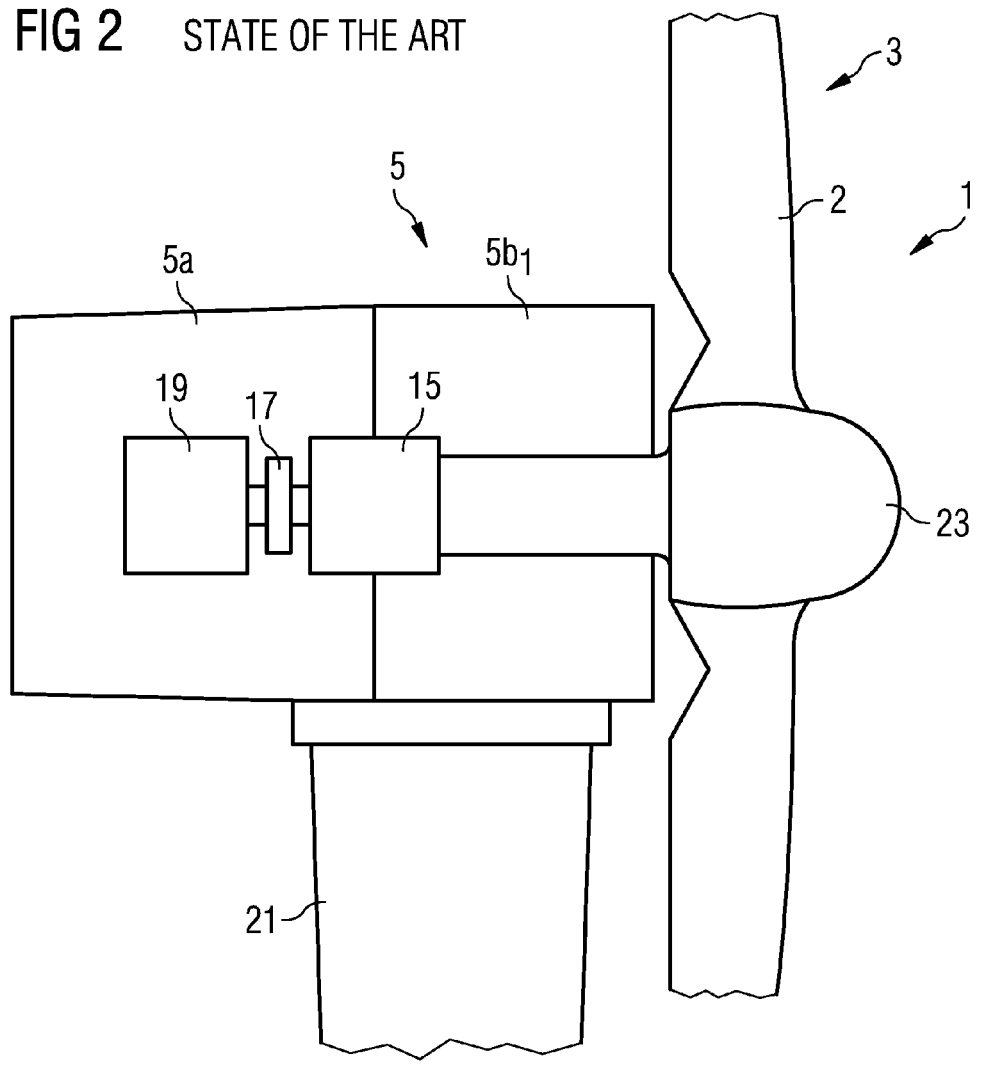
FIG. 2 shows a sectional view of a wind turbine according to the state of the art to be re-equipped using an embodiment of a re-equipment method according to the invention.

FIG. 2 shows a wind turbine 1 according to the state of the art basically comprising the same elements as described with reference to FIG. 1, with the exception that there is no first generator 7 included. Furthermore, the nacelle 5 is comprised of several parts, namely a first nacelle part 5a and a second nacelle part $5b_1$, whereby the second nacelle part $5b_1$ is closer to the hub 23 of the drive unit 3 than the first nacelle part 5a.

In order to re-equip this wind turbine 1 in the way that results in a wind turbine 1 as depicted in FIG. 1, i.e. according to an embodiment of the invention, the second nacelle part $5b_1$ needs to be removed and the first generator 7 (cf. FIG. 1) must be included in the region in between the drive unit 3 and the gear box 15. After that, a new second nacelle part (not shown) is assembled in that region so that the first nacelle part 5a and this new second nacelle part of a different size than the previously used second nacelle part $5b_1$ form a new nacelle 5.

Figure 3:
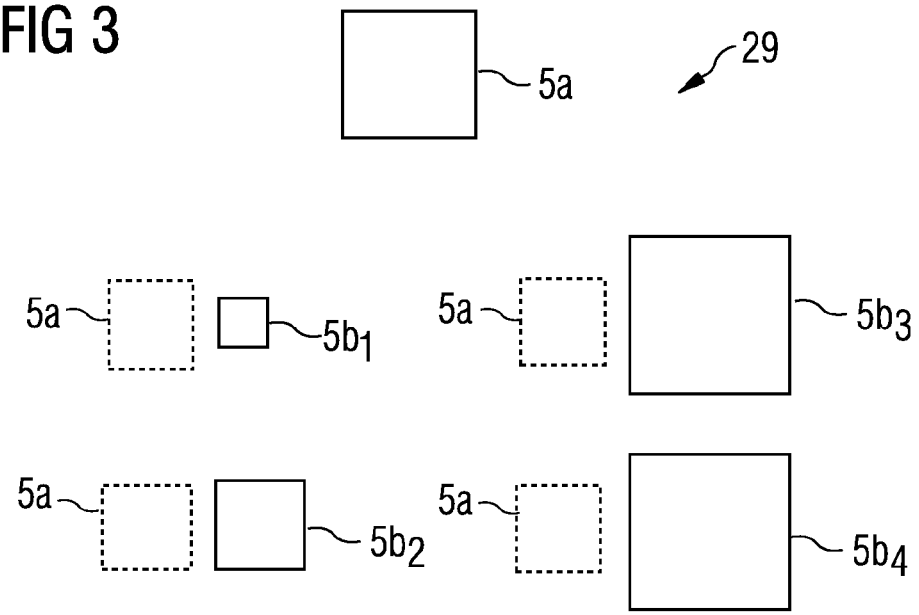
FIG. 3 shows a schematic view of an embodiment of a nacelle system according to the invention.

For that purpose a nacelle system 29 can be made use of, as is shown in FIG. 3. This nacelle system 29 comprises a first nacelle part 5a and a series of second nacelle parts 5b1, 5b2, 5b3, 5b4, each shown with a dotted line representing the first nacelle part 5a to indicate a respective positional relationship. All second nacelle parts 5b1, 5b2, 5b3, 5b4 fit together with the first nacelle part 5a, thus forming a complete nacelle in combination with it. As is schematically shown in FIG. 3, the second nacelle parts 5b1, 5b2, 5b3, 5b4 have different sizes, i.e. at least one of the following parameter values of each of the second nacelle parts is different and/or a combination of these parameter values of one specific second nacelle part is unique within the series. The parameter values comprise:
the width,
the height,
the depth,
the diameter in a cross section.

This means, that in order to assemble a particular combination of the first generator 7 and of a second generator 19 as shown in FIG. 1, the combination of the first nacelle part 5a with a suitable second nacelle part $5b_1$, $5b_2$, $5b_3$, $5b_4$ can be chosen such that this combination is suitable for housing the combination of a generators 7, 19. In this context it may be noted, that such nacelle system 29 can be employed in order to build a completely new nacelle 5 and thus a completely new wind turbine 1, but also for a re-equipment as explained in the context of FIG. 4.

Figure 4:
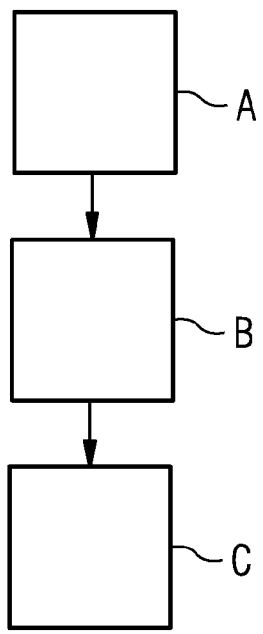
FIG. 4 shows a schematic block view of the principal steps of an embodiment of a method of building a nacelle according to the invention.

FIG. 4 shows schematically the steps of the method of building a nacelle 5 of a wind turbine 1 according to an embodiment of the invention, e.g. as shown in FIG. 1. This method comprises the following principal steps:

Firstly in a step A a first nacelle part 5a (cf. FIG. 3) is supplied. Secondly, in a step B out of a series of second nacelle parts $5b_1$, $5b_2$, $5b_3$, $5b_4$ there is chosen one particular second nacelle part. This choice is based on pre-assumptions including factors such as the size and/or the weight of the generators 7, 19 plus the drive train 13 and other components of the wind turbine 1 which will be housed by the nacelle 5. In the third step C the first nacelle part 5a is combined with the chosen second nacelle part from the series of nacelle parts $5b_1$, $5b_2$, $5b_3$, $5b_4$ so that in effect a nacelle 5 as shown in FIG. 1 is constructed.

Although the present invention has been disclosed in the form of preferred embodiments and variations thereon, it will be understood that numerous additional modifications and variations could be made thereto without departing from the scope of the invention. In particular the arrangement of the two generators within the nacelle and also the number of generators can be varied. The re-equipment of a wind turbine can also be such that a wind turbine with only an indirect drive generator can be enhanced by inclusion of a direct drive generator.

For the sake of clarity, it is to be understood that the use of "a" or "an" throughout this application does not exclude a plurality, and "comprising" does not exclude other steps or elements.

The invention claimed is:
1. A wind turbine, comprising:
a drive unit;
a generator assembly comprising
a first generator with a first stator and a first rotor, and
a second generator;
a drive train connecting the drive unit with the generator assembly,
wherein the first rotor is directly connected to the drive train,
wherein the second generator is indirectly coupled to the drive train via a gear box, and
wherein the drive unit, the first rotor, and the drive train rotate about a common axis.

2. The wind turbine according to claim 1, wherein the second generator and the gear box are comprised in a common operation unit.

3. The wind turbine according to claim 2, wherein the operation unit further comprises an azimuth drive.

4. The wind turbine according to claim 1, wherein the gear box comprises several output drive trains driving in operation the second generator and at least a third generator.

5. The wind turbine according to claim 1, further comprising:
a control unit that in operation derives control commands from variable input data which control commands serve to adjust a percentage of rotational energy of the drive train converted by the first generator or by the second generator or by the at least third generator.

6. The wind turbine according to claim 5, further comprising:
at least one adjustment unit connected to the first generator or the second generator or the at least third generator which adjusts the percentage of rotational energy in dependence of the control commands.

7. The wind turbine according to claim 1, further comprising:
a control unit that in operation derives control commands from variable input data which control commands serve to adjust a percentage of rotational energy of the drive train converted by the first generator and by the second generator and by the at least third generator.

8. The wind turbine according to claim 7, further comprising:
at least one adjustment unit connected to the first, second and the at least third generator which adjusts the percentage of rotational energy in dependence of the control commands.

9. A drive train assembly for a wind turbine connecting a drive unit with a generator assembly, wherein the generator assembly comprises
a first generator with a first stator and a first rotor, the first rotor being directly connected to a drive train of the drive train assembly,
at least a second generator indirectly coupled to the drive train via a gear box, and
wherein the drive unit, the first rotor, and the drive train rotate about a common axis.

10. A wind turbine nacelle system for building a nacelle for use in a wind turbine, the wind turbine comprising a first generator and a second generator, wherein the nacelle system comprises: a first nacelle part and a series of second nacelle parts, wherein the series of second nacelle parts comprises second nacelle parts, each being different in size than the first nacelle part, wherein the first nacelle part is adapted to surround the second generator in a wind turbine configuration where a drive unit, a first rotor of the first generator, and a drive train connecting the drive unit with the second generator all rotate about a common axis, and wherein each of the second nacelle parts is adapted to surround the first generator in the wind turbine configuration.

* * * * *